(12) United States Patent
Chen et al.

(10) Patent No.: US 6,697,348 B1
(45) Date of Patent: Feb. 24, 2004

(54) BURST DURATION ASSIGNMENT BASED ON FADING FLUCTUATION AND MOBILITY IN WIRELESS COMMUNICATION SYSTEMS

(75) Inventors: Tsao-Tsen Chen, Boonton, NJ (US); Wen-Yi Kuo, Parsippany, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/288,587

(22) Filed: Apr. 8, 1999

(51) Int. Cl.⁷ .................................................. H04J 3/00

(52) U.S. Cl. ....................... 370/337; 370/348; 370/252; 370/468; 370/470

(58) Field of Search .................................. 370/347, 337, 370/348, 252, 468, 455, 470; 375/132

(56) References Cited

U.S. PATENT DOCUMENTS

| | | | |
|---|---|---|---|
| 3,649,764 A | | 3/1972 | Maillet |
| 5,307,351 A | * | 4/1994 | Webster ...................... 370/470 |
| 5,602,831 A | * | 2/1997 | Gaskill ........................ 370/252 |
| 5,862,171 A | * | 1/1999 | Mahany ...................... 375/132 |
| 6,064,678 A | * | 5/2000 | Sindhushayana et al. ...................... 370/470 X |
| 6,173,011 B1 | * | 1/2001 | Rey et al. ..................... 375/233 |
| 6,307,867 B1 | * | 10/2001 | Roobol et al. .......... 370/347 X |
| 6,407,993 B1 | * | 6/2002 | Moulsley ................ 370/347 X |

FOREIGN PATENT DOCUMENTS

EP          0767548 A2    4/1997

* cited by examiner

*Primary Examiner*—Nay Maung
*Assistant Examiner*—Philip J. Sobutka

(57) ABSTRACT

The invention provides a novel burst duration assignment process that increases the performance and improves the throughput of communication systems. In particular, the invention provides an optimal burst duration assignment methodology such that resources are efficiently utilized and maximized in a communication system such as a code division multiple access (CDMA) system. According to the invention, burst duration is assigned based on channel fading fluctuation and user mobility in the communication system. In general, shorter burst duration is assigned to users with higher fading fluctuation and high mobility. Longer burst duration is assigned to users with lower fading fluctuation and low mobility. In a particular embodiment of the invention, the burst assignment is based on a function of duration versus fluctuation.

15 Claims, 3 Drawing Sheets

BURST DURATION ASSIGNMENT BASED ON FADING FLUCTUATION AND MOBILITY IN WIRELESS COMMUNICATION SYSTEMS

RELATED APPLICATIONS

The invention is related to U.S. patent application Ser. No. 09/288,364, filed concurrently herewith, entitled INTELLIGENT BURST CONTROL FUNCTIONS FOR WIRELESS COMMUNICATION SYSTEMS, U.S. patent application Ser. No. 09/288,365, entitled METHOD FOR PREMATURE TERMINATION OF BURST TRANSMISSION IN WIRELESS COMMUNICATION SYSTEMS, filed concurrently herewith, U.S. patent application Ser. No. 09/288,363, entitled SYSTEM AND METHOD FOR PREVENTION OF REVERSE JAMMING DUE TO LINK IMBALANCE IN WIRELESS COMMUNICATION SYSTEMS, filed concurrently herewith, U.S. patent application Ser. No. 09/288,368, entitled A METHOD OF QUEUE LENGTH BASED BURST MANAGEMENT IN WIRELESS COMMUNICATION SYSTEMS, filed concurrently herewith, U.S. patent application Ser. No. 09/288,006, entitled A METHOD OF DYNAMICALLY ADJUSTING THE DURATION OF A BURST TRANSMISSION IN WIRELESS COMMUNICATION SYSTEMS, filed concurrently herewith, U.S. patent application Ser. No. 09/292,239, entitled METHOD FOR IMPROVED TRANSMISSION EFFICIENCY BETWEEN DATA NETWORKS AND WIRELESS COMMUNICATION SYSTEMS, filed concurrently herewith, all of which are assigned to the same assignee and are incorporated by reference herein.

FIELD OF THE INVENTION

The invention relates to wireless communication systems and, more particularly, to the assignment of burst transmissions in such systems.

BACKGROUND OF THE INVENTION

Wireless communication systems have been developed to allow transmission of information signals between an originating location and a destination location. Both analog (first generation) and digital (second generation) systems have been used to transmit such information signals over communication channels linking the source and destination locations. Digital methods tend to afford several advantages relative to analog techniques, including, e.g., improved immunity to channel noise and interference, increased capacity, and improved security of communication through the use of encryption.

While first generation systems were primarily directed to voice communication, second generation systems support both voice and data applications. Numerous techniques are known in second-generation systems for handling data transmissions which have different transmission requirements. Several modulation/coding arrangements have been developed for wireless systems based on multiple access techniques, e.g., frequency division multiple access (FDMA), time division multiple access (TDMA) and code division multiple access (CDMA). In FDMA techniques, each user is allocated one or more specific sub-bands of frequency. In TDMA techniques, periodically recurring time slots are identified, and for each segment of time each user is allocated one or more time slots. CDMA systems provide reduced multiple path distortion and co-channel interference and reduce the burden of frequency/channel planning that is common with FDMA and TDMA systems.

In a CDMA system, a unique binary spreading sequence (a code) is assigned for each call to each user. Multiplied by the assigned code, the user's signal is spread unto a channel bandwidth much wider than the user signal bandwidth. The ratio of the system channel bandwidth to the user's bandwidth is commonly called the spreading gain. All active users share the same system channel bandwidth frequency spectrum at the same time. Calculating the signal-to-interference ratio (SIR) determines the connection quality of the transmission link. Given a required SIR, the system capacity is proportional to the spreading gain. The signal of each user is separated from the others at the receiver by using a correlator keyed with the associated code sequence to de-spread the desired signal.

First-generation analog and second-generation digital systems were designed to support voice communication with limited data communication capabilities. Third-generation wireless systems, using wide-band multiple access technologies such as CDMA, are expected to effectively handle a large variety of services, such as voice, video, data and imaging. Among the features which will be supported by third-generation systems is the transmission of high-speed data between a mobile terminal and a land-line network. As is known, high-speed data communications is often characterized by a short transmission "burst" at a high data transmission rate, followed by some longer period of little or no transmission activity from the data source. To accommodate the bursty nature of such high-speed data services in third-generation systems, it is necessary for the communications system to assign a large bandwidth segment (corresponding to the high data rate) from time to time for the duration of the data burst. With the ability of the third generation systems to handle such bursty high-speed data transmission, throughput and delay for users can be advantageously improved. However, because of the large amount of instantaneous bandwidth required for transmission of a burst of high-speed data, the management of such bursts, and particularly the allocation of power and system resources thereto, must be handled with care to avoid unwarranted interference with other services using the same frequency allocation. Consequently, system designers need to deal with many issues in setting efficient data rates for different types of communications via a wireless link, including appropriate allocation of system resources for the bursts of data experienced with high-speed data service.

There is a continuing need to increase the performance and improve the throughput of wireless communication systems. In particular, there is a need for an improved burst duration assignment methodology such that resources are efficiently utilized in a communication system such as CDMA.

There is also a need to avoid overhead and power-overload problems in burst duration assignment for communication systems.

SUMMARY OF THE INVENTION

The invention provides a novel burst duration management process that increases the performance and the throughput of wireless communication systems. In particular, the invention provides an improved burst duration assignment methodology that results in an efficient utilization of resources in a communication system such as one based on CDMA. According to the invention, burst duration is assigned in relation to channel fading fluctuation and user mobility in the communication system. In general, a short burst duration is assigned to users with high fading fluctuation and/or high mobility. A long burst duration is assigned to users with low fading fluctuation and/or low mobility. In a particular embodiment of the invention, the burst assignment is based on a function of duration versus fluctuation. The invention advantageously avoids overhead and power-overload problems in burst duration assignment for both the forward link and the reverse link in wireless communication systems. The invention also avoids problems due to changing conditions such as user mobility and fading during a burst duration assignment.

DETAILED DESCRIPTION

Figure 1:
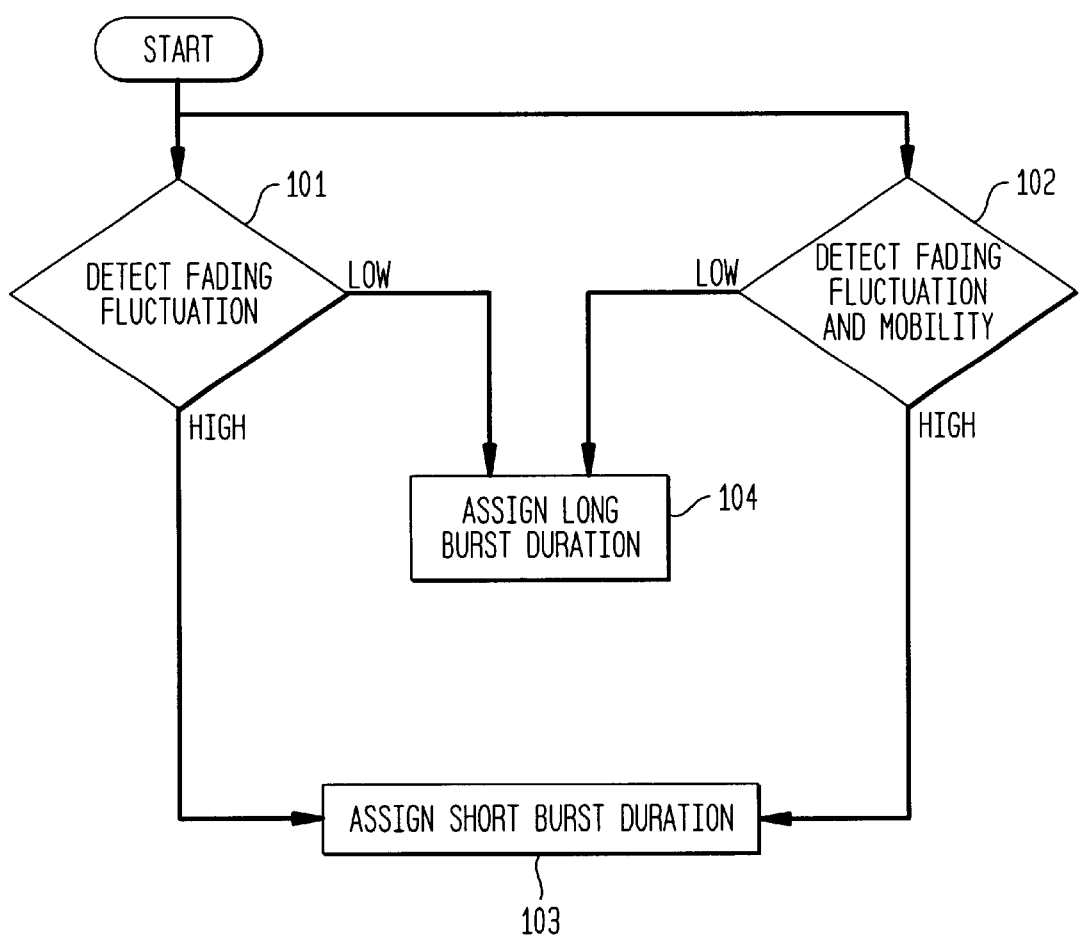
FIG. 1 is a flow diagram illustrating the general methodology of the invention.

The focus of early wireless systems, particularly first-generation analog systems, was primarily voice communication. With second-generation wireless systems, including CDMA, TDMA and Global System for Mobile Communications (GSM), came varying degrees of improvement in terms of voice quality, network capacity and enhanced services. However, while second-generation systems are suitable to the provision of voice, low rate data, fax and messaging, they are generally not able to effectively address requirements for high-speed mobile data rates. The evolution to third-generation wireless communications represents, essentially, a paradigm shift to the world of multimedia mobile communications, where users will have access not just to voice services but also to video, image, text, graphic and data communications. The third-generation networks are expected to provide mobile users with data rates of between 144 Kbps and 2 Mbps.

Nonetheless, in wireless networks supporting higher speed data communications applications, burst transmission duration must be managed very carefully to avoid power overload or unacceptable interference when handling higher speed applications and other applications (e.g., voice calls). As will be shown hereafter, the invention provides a novel methodology that increases the performance of wireless communication systems by efficiently managing the assignment of burst transmission duration with respect to such higher speed data applications. Although the invention will be hereafter described in terms of a preferred embodiment based on CDMA encoding of the wireless signals, it should be apparent that the methodology of the invention can also be applied for other wireless channelization arrangements, including TDMA and GSM.

Burst duration assignment has significant impact on the allocation of system resources and the transmission delay experienced by individual users. A user may experience overhead problems in the burst initialization process if the assigned burst duration is too short. An example of overhead is when the user is required to wait for the processing of data packets to clear when implementing successive short burst transmissions, resulting in delay problems for the user. On the other hand, if the assigned burst duration is too long, system resources may be wasted because power overload or fading problems occurring during the burst result in an unsustainable or ineffectual burst transmission. For highly mobile users, fading conditions tend to change rapidly, possibly resulting in significant change in the power requirement, or the operating signal-to-interference ratio (SIR). In addition, highly mobile users may encounter soft handoff activity, resulting in the adding or dropping of BTSs to or from the active set of BTSs in communication with a given MS. A properly assigned burst duration is therefore critical in order to conserve and efficiently utilize system resources.

The negative effects of power overloading and fading problems on a wireless communication system are discussed in detail in U.S. patent application Ser. No. 09/288,365, entitled METHOD FOR PREMATURE TERMINATION OF BURST TRANSMISSION FOR WIRELESS COMMUNICATION SYSTEMS, filed concurrently herewith and incorporated by reference herein.

The method of the invention operates to gauge burst duration assignments in relation to operating conditions in the wireless system, particularly the degree of fluctuation in signal fading for the user environment and the relative mobility of the user. According to the principle of the invention, the primary factor for gauging burst duration assignments is the degree of fading fluctuation. A secondary consideration of user-mobility can also be included in determining the duration of a particular burst transmission.

A high level depiction of the method of the invention is provided in FIG. 1. Referring to the figure, the wireless system first makes a determination in Step 101 of the fading fluctuation for the data channels which are serving the users. A short burst duration is assigned to the users with high fading fluctuation, as depicted in Step 103. A long burst duration is assigned to the users with low fading fluctuation, as in Step 104. In addition to considering fading fluctuation in assigning burst duration, the system can also make a determination as to the level of user mobility in Step 102. When a mobile station is determined to be operating with a high degree of mobility, a short burst duration is assigned for communications with that mobile station, as in Step 103. Contrariwise, a long burst duration is assigned to mobile stations with low user mobility, as in Step 104.

For the case of burst duration assignment in relation to fading fluctuation, an exemplary method of monitoring and measuring the fading fluctuation of data channels is hereinafter described. According to the exemplary method, the BTSs which are in communication with a particular user (i.e., a particular MS) continuously monitor the power measurements of the traffic channels serving the user. The power variance, or rate of change, may be viewed as a proxy for fading. The standard deviation of power or SIR, which is the square root of the relative power variance or SIR for different transmission paths, is determined based on the power measurements.

A particular technique which may be applied is to continuously monitor the power fluctuation by obtaining power statistics or by filtering instantaneous power measurements—for example, by using a single-pole infinite impulse response (IIR) filter, as depicted below:

$$y(n)=\alpha^*y(n-1)+(1-\alpha)^*x(n)$$

$$z(n)=\beta^*z(n-1)+(1-\beta)^*(x(n)-y(n))^2$$

where $y(n)$ is the filtered result at time n, $x(n)$ is the input (instantaneous measurements) at time n, $z(n)$ is the variance at time n, $\alpha$ and $\beta$ are the parameters of the IIR filter.

Change in the operating SIR is another metric that can be used for monitoring the channel fading fluctuation. An exemplary measure of the power fluctuation, which can be measured in terms of the fluctuation in power consumption or SIR, for both the forward link and the reverse link, is given below:

forward fluctuation=standard deviation of forward power fraction for the specific user's traffic channel reverse fluctuation=standard deviation of reverse $E_b/N_t$ (=SIR) for the specific user's traffic channel where $E_b$ represents the energy per bit and $N_t$ is the total interference density (per Hertz). Using the above IIR filter, the power fluctuation in the forward link and the reverse link is given below:

forward fluctuation=square root of z(n) with x(n) being the forward power fraction for the specific user's traffic channel reverse fluctuation=square root of z(n) with x(n) being reverse $E_b/N_t$ for the specific user's traffic channel Note that the forward power fraction used to obtain the forward channel fluctuation for a given user's traffic channel can be continuously monitored by the BTSs associated with the given user. The reverse channel fluctuation can be similarly measured by monitoring the $E_b/N_t$ (or, SIR) for the given user's traffic channel. Using the terminology of the CDMA2000 standard (IS-95C or IS-2000), a wireless standard developed by the U.S.-based Telecommunications Industry Association, the traffic channel can be the Fundamental Channel (FCH) or the Dedicated Control Channel (DCCH), which are active when the wireless system is assigning burst transmissions.

With the fading/power fluctuations determined as described above, the method of the invention proceeds to a determination of the appropriate burst assignment duration for the given user in respect to such fluctuation. According to the principle of the invention, it is desirable that the assigned burst duration decreases with increases in fading/power fluctuation. Various functional relationships can be derived between burst duration and fluctuation to implement this principle. Based on the standard deviation of power or SIR, a function of decreasing slope (hereinafter denoted as "the decreasing function") of burst duration versus fading fluctuation can be obtained. Pursuant to the decreasing function, burst transmissions are accordingly assigned with an appropriate duration to minimize data transmission problems due to power overloading, overhead or changing fading conditions. An exemplary decreasing function relating duration and fluctuation in the forward link can be described algebraically as:

$$d = d_0 + \frac{a}{(\mathit{ff} + 1)^k}$$

where
d=burst duration;
$d_0$=minimum burst duration;
a=slope coefficient;
k=curve exponent; and
ff=forward fluctuation metric.

Figure 2:
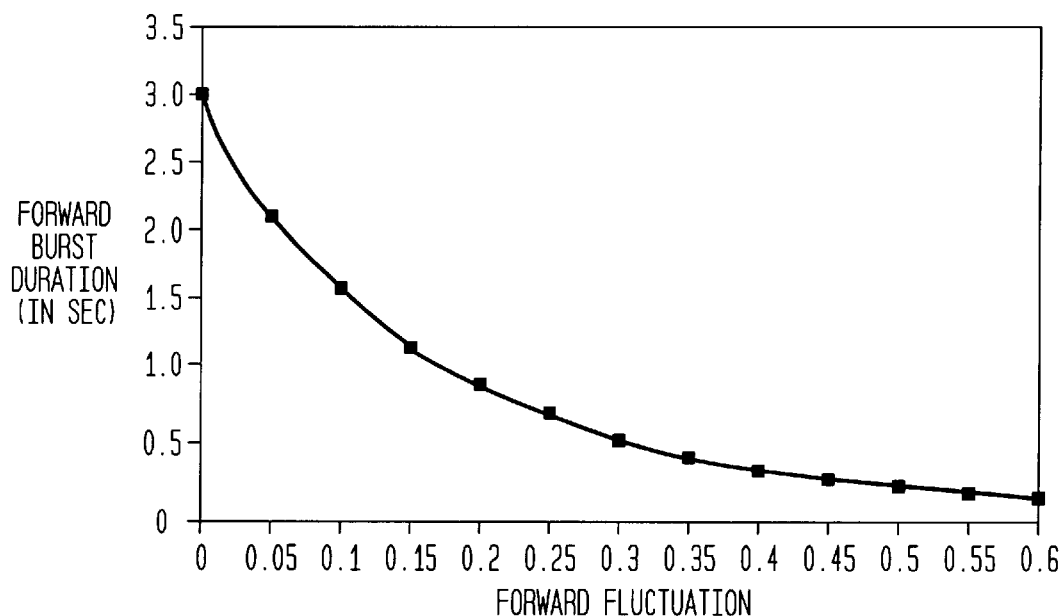
FIG. 2 illustrates an exemplary function upon which forward burst transmissions are implemented according to the invention.

Using the power fraction standard deviation with $d_0$=0.06, k=7, a=3, a curve depicting the duration versus fluctuation relationship for the forward link is shown in FIG. 2. From this curve (or the algorithm used to derive it), the system can then determine and assign the burst duration that efficiently utilizes system resources based on the previously determined fluctuation.

For the reverse link, the relationship between the duration and the fluctuation can be expressed by the exemplary decreasing function:

$$d = d_0 + \frac{a}{(\mathit{rf} + 1)^k}$$

where
$d_0$=burst duration;
$d_0$=minimum burst duration;
a=slope coefficient;
k=curve exponent; and
rf=reverse fluctuation metric.

Figure 3:
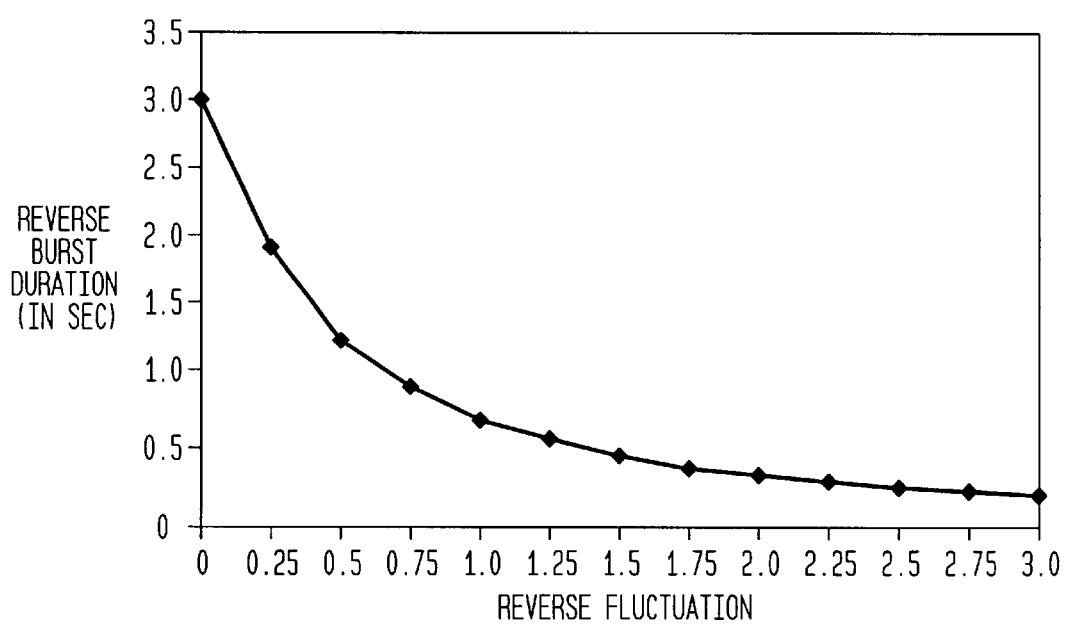
FIG. 3 illustrates an exemplary function upon which reverse burst transmissions are implemented according to the invention.

Using the standard deviation of $E_b/N_t$ (in dB) with $d_0$=0.06, k=2, a=3, a curve depicting the duration versus fluctuation relationship for the reverse link is shown in FIG. 3. From this curve (or the algorithm used to derive it), the system can then determine and assign the burst duration that efficiently utilizes system resources based on the previously determined fluctuation.

The exemplary values described above and used for the determination of the duration/fluctuation curves of FIGS. 2 and 3 are exactly that, exemplary. As should be apparent, the use of other values and other curves would be equally within the contemplation of the method of the invention. Nonetheless, some of the considerations for the choice of this particular set of exemplary values are worthy of note. According to the principle of the invention, it is desirable that the decreasing function of fluctuation to duration be of a convex curve shape, and the curve exponent, k, is chosen accordingly. The value of the curve exponent (k) also depends on the valid range of the forward fluctuation metric (ff) or the reverse fluctuation metric (rf). And, to reflect the fact that the range of fluctuation is different for forward and reverse transmissions, a larger value of k (7) is chosen for the forward link curve than the value (2) chosen for the reverse link. Note also that an asymptotic burst duration, (representing the shortest duration possible) can be attained as the amplitude of the forward fluctuation metric (ff) or the reverse fluctuation metric approaches infinity. The minimum burst duration, $d_0$, is selected to be equal to a 3 frame duration (0.06 sec) as approximating such an asymptotic duration. Conversely, the amplitude of the forward fluctuation metric or the reverse fluctuation metric at zero represents the longest burst duration that would be assigned to a data user. Here, a value of 3.06 seconds (rounded to 3 seconds) is chosen as the value of the maximum burst duration, and accordingly the value of the slope coefficient, a, becomes 3.

Note that in this embodiment, the forward fluctuation metric is linear, whereas the reverse fluctuation metric is measured in decibels (dB) in the reverse link. Alternative implementations in which the reverse fluctuation metric is linearly defined and the forward fluctuation metric is measured in dB are also possible.

Figure 4:
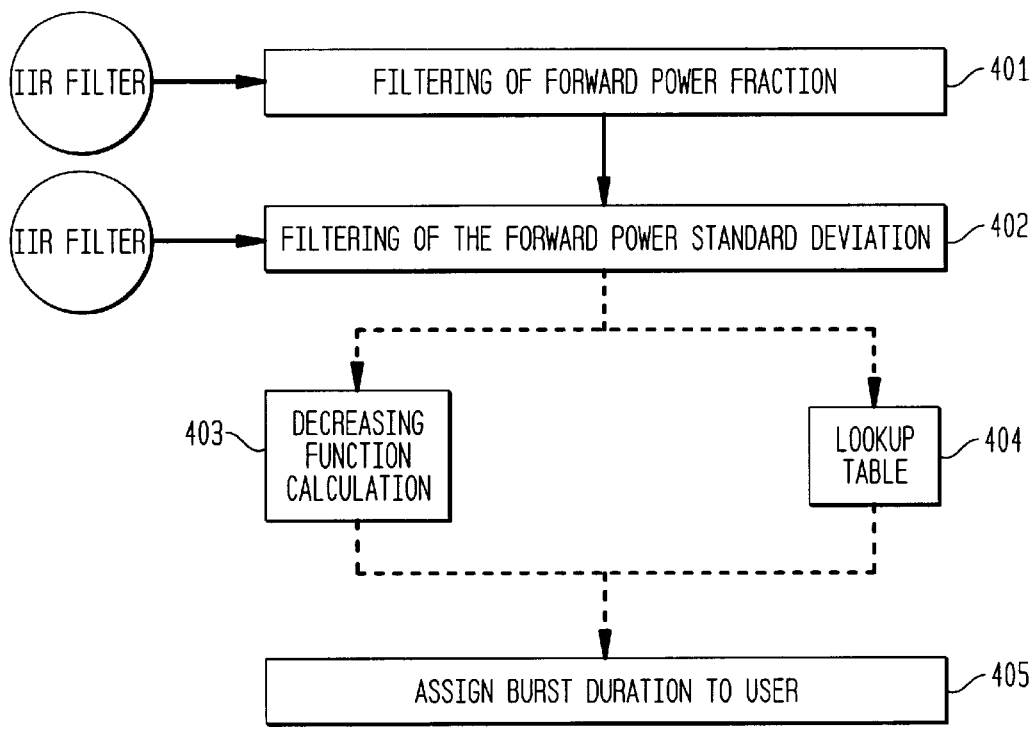
FIG. 4 is a flow diagram illustrating an exemplary burst assignment in the forward link in accordance with the invention.

FIG. 4 illustrates an exemplary burst assignment for the forward link in accordance with the invention. Using an IIR (Infinite Impulse Response) filter, the forward power fraction for transmission in a traffic channel for a particular user (e.g., DCCH/FCH in CDMA2000) in the wireless system is filtered for the measurement of the power fluctuation therein in Step 401. The standard deviation of the forward power fraction is filtered in Step 402. An exemplary IIR filter suitable for implementing Steps 401 and 402 is described hereinabove. Parameters determined by the IIR filtering in Steps 401 and 402 can then be used for calculating the appropriate burst duration for the particular data channel in Step 403. Alternatively, the parameters determined in the IIR filtering steps can be used to build a lookup table from which an appropriate burst duration for the particular data channel conditions can be read, as in Step 404. In Step 405, the burst duration determined in either Step 403 or 404 is assigned to the particular data channel.

Figure 5:
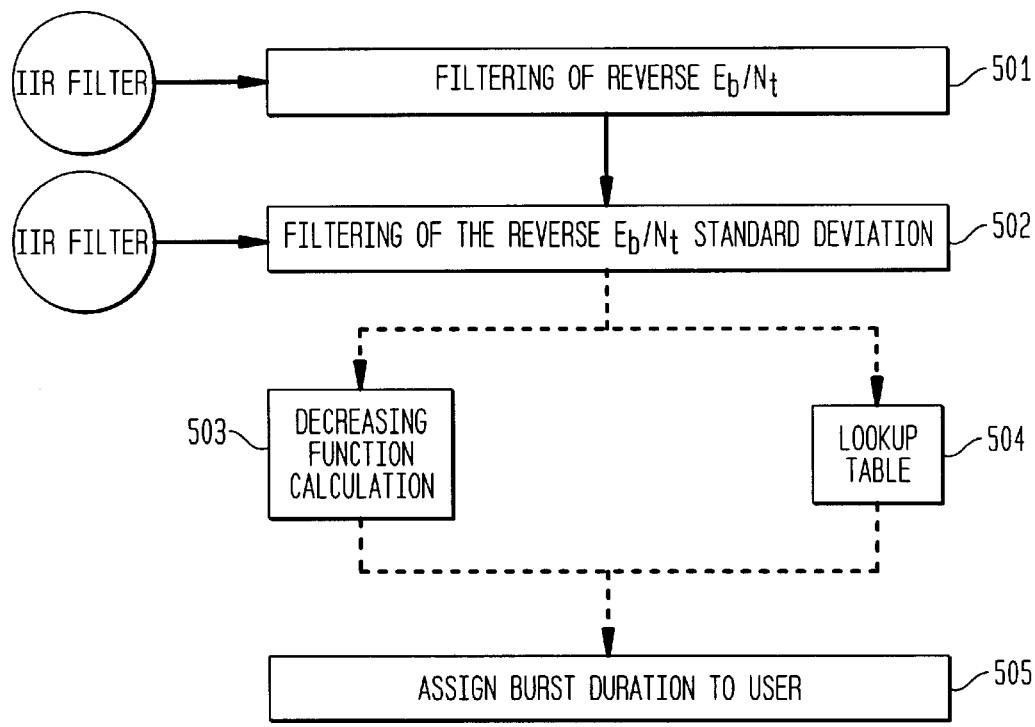
FIG. 5 is a flow diagram illustrating an exemplary burst assignment in the reverse link in accordance with the invention.

FIG. 5 illustrates an exemplary burst assignment for the reverse link in accordance with the invention. Using an IIR (Infinite Impulse Response) filter, the reverse $E_b/N_t$ for transmission in a traffic channel for a particular user (e.g., DCCH/FCH in CDMA2000) in the wireless system is filtered for the measurement $E_b/N_t$ of the power fluctuation therein in Step 501. The standard deviation of the reverse $E_b/N_t$ is filtered in Step 502. An exemplary IIR filter suitable for implementing Steps 501 and 502 is described hereinabove. Parameters determined by the IIR filtering in Steps 501 and 502 can then be used for calculating the appropriate burst duration for the particular data channel in Step 503. Alternatively, the parameters determined in the IIR filtering steps can be used to build a lookup table from which an appropriate burst duration for the particular data channel, as in Step 504. In Step 505, the burst duration determined in either Step 503 or 504 is assigned to the particular data channel.

User mobility may have significant impact on the transmission quality in addition to the primary consideration of fading fluctuation in a wireless system. For highly mobile users, fading conditions tend to change rapidly, possibly resulting in significant change in the power requirement, or the operating signal-to-interference ratio (SIR). In addition, highly mobile users are much more likely to encounter soft handoff activity, resulting in the adding or dropping of BTSs to or from the active set of BTSs in communication with a given MS. It is therefore advantageous to also monitor and utilize user mobility for the determination of an appropriate burst duration assignment.

The monitoring of user mobility is similar to the process of monitoring the fading fluctuation. Monitoring of the changing rate of the path delay in the fingers of the rake receiver in the mobile station facilitates the monitoring and measuring of user mobility. With the user mobility determined as described, the method of the invention proceeds to a determination of the appropriate burst assignment duration for the given user. In general, the power variance is higher in the instance of high user mobility, whereas the variance is lower in the instance of low mobility. According to the principle of the invention, it is desirable that the assigned burst duration decreases with increases in user mobility. Various functional relationships can be derived between burst duration and mobility to implement this principle. Considering both fading fluctuation and user mobility for the forward link, the methodology, in a form of an exemplary decreasing function, is depicted below:

$$d=d_0+a/(ff+b*r+1)^k$$

where
    d=burst duration;
    $d_0$=minimum burst duration;
    a=slope coefficient;
    b=mobility coefficient;
    r=changing rate of the path delay;
    k=curve exponent; and
    ff=forward fluctuation metric.

Based on the decreasing function, the system can then determine and assign the burst duration that maximizes and efficiently utilizes system resources. Considering both fading fluctuation and user mobility for the reverse link, the methodology is expressed in an exemplary decreasing function below:

$$d=d_0+a/(rf+b*r+1)^k$$

where
    d=burst duration;
    $d_0$=minimum burst duration;
    a=slope coefficient;
    b=mobility coefficient;
    r=changing rate of the path delay;
    k=curve exponent; and
    rf=reverse fluctuation metric.

Microchips or DSP (digital signal processing) functionality embedded in the BSC (Base Station Controller) can perform the calculations in the algorithms disclosed hereinabove. In the alternative, given as a system input with some basic input parameters (such as the forward fluctuation metric ff the reverse fluctuation metric rf and the changing rate of the path delay r), the BSC can locate a value in a stored lookup table that is associated with the particular MS/BTS combination at the time. Other parameters that can be input into the lookup table include the minimum burst duration ($d_0$), the slope coefficient (a), the mobility coefficient (b) and the curve exponent (k). Inputting the parameters into the lookup table yields a burst duration (d) that is appropriate for the conditions of the wireless system as represented by the input parameters. With the aide of the lookup table, the wireless system can accordingly assign a burst duration without the necessity of performing formulaic calculations at every instance.

Those skilled in the art will recognize that there are many configurations of wireless systems not specifically described herein but for which the methodology of the invention may be applied. Although the invention is described in its preferred embodiments, it is not intended to limit the invention to the precise embodiments disclosed herein. In particular, the invention can be utilized for third-generation mobile or personal communication systems that offer a multitude of data services in different operating scenarios, such as telephony, teleconference, voice mail, program sound, video telephony, video conference, remote terminal, user profile editing, telefax, voiceband data, database access, message broadcast, unrestricted digital information, navigation, location and Internet access services. The burst control methodology of the invention can also be utilized in second-generation systems, or any system that has burst transmission capability.

Accordingly, this description is to be construed as illustrative only. Those skilled in this technology can make various alterations and modifications without departing from the scope and spirit of this invention. Therefore, the scope of the invention shall be defined and protected by the following claims and their equivalents. The invention is to be accorded the widest scope consistent with the principles and novel features disclosed herein. The exclusive use of all modifications within the scope of the claims is reserved.

We claim:

1. A method for determining burst duration for a wireless system having a plurality of base transceiver stations operative to serve a plurality of mobile stations, the base transceiver stations (BTS) and the mobile stations (MS) forming a plurality of BTS-MS transmission paths, the method comprising the steps of:

distinguishing at least one BTS-MS path by a level of fading fluctuation;

assigning burst duration as a function of the fading fluctuation to the at least one BTS-MS path; and wherein the function is:

$$d = d_0 + \frac{a}{(ff+1)^k}$$

wherein d is the assigned burst duration, $d_0$ is a minimum burst duration, a is a slope coefficient, k is a curve exponent, and ff is a forward fluctuation metric.

2. A method for determining burst duration for a wireless system having a plurality of base transceiver stations operative to serve a plurality of mobile stations, the base transceiver stations (BTS) and the mobile stations (MS) forming a plurality of BTS-MS transmission paths, the method comprising the steps of:

distinguishing at least one BTS-MS path by a level of fading fluctuation;

assigning burst duration as a function of the fading fluctuation to the at least one BTS-MS path; and wherein the function is:

$$d = d_0 + \frac{a}{(rf+1)^k}$$

wherein d is the assigned burst duration, $d_0$ is a minimum burst duration, a is a slope coefficient, k is a curve exponent, and rf is a reverse fluctuation metric.

3. A method for determining burst duration for a wireless system having a plurality of base transceiver stations operative to serve a plurality of mobile stations, the base transceiver stations (BTS) and the mobile stations (MS) forming a plurality of BTS-MS transmission paths, the method comprising the steps of:

distinguishing at least one BTS-MS path by a level of fading fluctuation;

assigning burst duration as a function of the fading fluctuation to the at least one BTS-MS path; and wherein a burst duration is assigned to the at least one BTS-MS path according to a function of:

$$d = d_0 + a/(ff + b*r + 1)^k$$

wherein d is the burst duration, $d_0$ is a minimum burst duration, a is a slope coefficient, b is a mobility coefficient, r is a changing rate of path delay, k is a curve exponent, and ff is a forward fluctuation metric.

4. A method for determining burst duration for a wireless system having a plurality of base transceiver stations operative to serve a plurality of mobile stations, the base transceiver stations (BTS) and the mobile stations (MS) forming a plurality of BTS-MS transmission paths, the method comprising the steps of:

distinguishing at least one BTS-MS path by a level of fading fluctuation;

assigning burst duration as a function of the fading fluctuation to the at least one BTS-MS path; and wherein a burst duration is assigned to the at least one BTS-MS path according to a function of:

$$d = d_0 + a/(rf + b*r + 1)^k$$

wherein d is the burst duration, $d_0$ is a minimum burst duration, a is a slope coefficient, b is a mobility coefficient, r is a changing rate of path delay, k is a curve exponent, and rf is a reverse fluctuation metric.

5. A method for determining burst duration for a wireless system having a plurality of base transceiver stations operative to serve a plurality of mobile stations, the base transceiver stations (BTS) and the mobile stations (MS) forming a plurality of BTS-MS transmission paths, the method comprising the steps of:

detecting a forward power fraction for the at least one BTS-MS path;

obtaining a standard deviation of the forward power fraction for the at least one BTS-MS path;

determining a forward fluctuation for the at least one BTS-MS path; and assigning a burst duration to the at least one BTS-MS path according to the forward fluctuation.

6. A method for determining burst duration for a wireless system having a plurality of base transceiver stations operative to serve a plurality of mobile stations, the base transceiver stations (BTS) and the mobile stations (MS) forming a plurality of BTS-MS transmission paths, the method comprising the steps of:

determining a reverse fluctuation for the at least one BTS-MS path; and assigning a burst duration to the at least one BTS-MS path according to the reverse fluctuation, defined as:

reverse fluctuation=standard deviation of reverse $E_b/N_t$ wherein $E_b$ represents energy per bit and $N_t$ is total interference density for the at least one BTS-MS path.

7. A method for determining burst duration for a wireless system having a plurality of base transceiver stations operative to serve a plurality of mobile stations, the base transceiver stations (BTS) and the mobile stations (MS) forming a plurality of BTS-MS transmission paths, the method comprising the steps of:

creating a lookup table established to receive input parameters of a minimum burst duration, a slope coefficient, a curve exponent, and a forward fluctuation metric; and assigning a burst duration to the at least one BTS-MS path according to a duration output by the lookup table.

8. The method in claim 7, wherein the lookup table is established to receive input parameters of a mobility coefficient and a changing rate of path delay.

9. A method for determining burst duration for a wireless system having a plurality of base transceiver stations operative to serve a plurality of mobile stations, the base transceiver stations (BTS) and the mobile stations (MS) forming a plurality of BTS-MS transmission paths, the method comprising the steps of:

creating a lookup table established to receive input parameters of a minimum burst duration, a slope coefficient, a curve exponent, and a reverse fluctuation metric; and assigning a burst duration to the at least one BTS-MS path according to a duration output by the lookup table.

10. The method in claim 9, wherein the lookup table is established to receive input parameters of a mobility coefficient and a changing rate of path delay.

11. A method for determining burst duration for a wireless system having a plurality of base transceiver stations operative to serve a plurality of mobile stations, the base transceiver stations (BTS) and the mobile stations (MS) forming a plurality of BTS-MS transmission paths, the method comprising the steps of:

distinguishing at least one BTS-MS path by a level of fading fluctuation;

assigning burst duration as a function of the fading fluctuation to the at least one BTS-MS path; and filtering power measurements of the at least one BTS-MS path, wherein the filtering is implemented with at least one infinite impulse response (IIR) filter, as defined by:

$$y(n)=\alpha*y(n-1)+(1-\alpha)*x(n)$$

$$z(n)=\beta*z(n-1)+(1-\beta)*(x(n)-y(n))^2$$

wherein y(n) is a filtered result at time n, x(n) is an input of power measurements at time n, z(n) is a power variance at time n, $\alpha$ and $\beta$ are predetermined parameters of the IIR filter.

12. A method for determining burst duration for a wireless system having a plurality of base transceiver stations operative to serve a plurality of mobile stations, the base transceiver stations (BTS) and the mobile stations (MS) forming a plurality of BTS-MS transmission paths, the method comprising the steps of:

filtering a forward power fraction for the at least one BTS-MS path;

filtering a standard power deviation of the forward power fraction; and calculating a burst duration according to a function for the at least one BTS-MS path; and wherein the filtering steps are implemented with at least one infinite impulse response (IIR) filter.

13. A method for determining burst duration for a wireless system having a plurality of base transceiver stations operative to serve a plurality of mobile stations, the base transceiver stations (BTS) and the mobile stations (MS) forming a plurality of BTS-MS transmission paths, the method comprising the steps of:

filtering a forward power fraction for the at least one BTS-MS path;

filtering a standard power deviation of the forward power fraction;

inputting the standard power deviation into a lookup table;

assigning a burst duration to the at least one BTS-MS path; and wherein the lookup table yields the burst duration and the filtering steps are implemented with at least one infinite impulse response (IIR) filter.

14. A method for determining burst duration for a wireless system having a plurality of base transceiver stations operative to serve a plurality of mobile stations, the base transceiver stations (BTS) and the mobile stations (MS) forming a plurality of BTS-MS transmission paths, the method comprising the steps of:

filtering a reverse $E_b/N_t$ for the at least one BTS-MS path;

filtering a standard power deviation of the reverse $E_b/N_t$;

calculating a burst duration according to a function for the at least one BTS-MS path; and where $E_b$ represents energy per bit and $N_t$ is total interference density for the at least one BTS-MS path, and wherein the filtering steps are implemented with at least one infinite impulse response (IIR) filter.

15. A method for determining burst duration for a wireless system having a plurality of base transceiver stations operative to serve a plurality of mobile stations, the base transceiver stations (BTS) and the mobile stations (MS) forming a plurality of BTS-MS transmission paths, the method comprising the steps of:

filtering a reverse $E_b/N_t$ for the at least one BTS-MS path;

filtering a standard power deviation of the reverse $E_b/N_t$;

inputting the standard power deviation into a lookup table; and assigning a burst duration to the at least one BTS-MS path;

where $E_b$ represents energy per bit and $N_t$ is total interference density for the at least one BTS-MS path, and wherein the lookup table yields the burst duration and the filtering steps are implemented with at least one infinite impulse response (IIR) filter.

* * * * *